(12) United States Patent
Mayer

(10) Patent No.: US 7,908,936 B2
(45) Date of Patent: Mar. 22, 2011

(54) SYSTEM AND METHOD FOR GENERATING A GAS SAMPLE OF KNOWN AND ADJUSTABLE RELATIVE HUMIDITY

(75) Inventor: Daniel W. Mayer, Wyoming, MN (US)

(73) Assignee: Mocon, Inc., Minneapolis, MN (US)

( * ) Notice: Subject to any disclaimer, the term of this patent is extended or adjusted under 35 U.S.C. 154(b) by 0 days.

(21) Appl. No.: 12/406,603

(22) Filed: Mar. 18, 2009

(65) Prior Publication Data
US 2009/0173172 A1 Jul. 9, 2009

Related U.S. Application Data

(62) Division of application No. 11/611,511, filed on Dec. 15, 2006, now Pat. No. 7,578,208.

(51) Int. Cl.
*G01N 17/00* (2006.01)
*G01N 15/08* (2006.01)
*B01F 3/04* (2006.01)

(52) U.S. Cl. ............................. 73/865.6; 73/38; 261/128

(58) Field of Classification Search ........... 73/38, 856.6; 261/121.1, 128; 236/12.12
See application file for complete search history.

(56) References Cited

U.S. PATENT DOCUMENTS

| | | |
|---|---|---|
| 2,082,363 A | 6/1937 | Stone |
| 2,453,620 A | 11/1948 | Cathey et al. |
| 2,540,674 A | 2/1951 | Jacobson |
| 2,651,612 A | 9/1953 | Haller |
| 3,223,597 A | 12/1965 | Hersch |
| 3,286,509 A | 11/1966 | Gluckman et al. |
| 3,385,578 A | 5/1968 | Porter |
| 3,498,110 A | 3/1970 | Brun |
| 3,531,916 A | 10/1970 | Kulperger et al. |
| 3,583,685 A | 6/1971 | Boerger et al. |
| 3,590,634 A | 7/1971 | Pasternak et al. |
| 3,590,902 A | 7/1971 | Walker et al. |
| 3,604,246 A | 9/1971 | Toren |
| 3,756,577 A | 9/1973 | Breiling |
| 3,760,773 A | 9/1973 | Christensen |
| 3,900,382 A | 8/1975 | Brown |
| 3,926,561 A | 12/1975 | Lucero |
| 4,085,024 A | 4/1978 | Lawson |
| 4,276,243 A | 6/1981 | Partus |

(Continued)

FOREIGN PATENT DOCUMENTS

CN 1818644 8/2006

(Continued)

OTHER PUBLICATIONS

Grot, Walther; "Perfluorinated Cation-Exchanger-Polymer"; Chemie Ingenieur Technik 47; p. 617 (1975).

*Primary Examiner* — John Fitzgerald
(74) *Attorney, Agent, or Firm* — Sherrill Law Offices, PLLC

(57) ABSTRACT

A system and method for providing a destination point with a gas having a selectable known humidity. A gas having an initial relative humidity is alternately directed in accordance with a duty cycle along a wet path effective for humidifying the gas to provide a wet gas, and a dry path effective for either maintaining the initial relative humidity of the gas or dehumidifying the gas to provide a dry gas. The wet and dry gas is blended to produce a blended gas having a selected relative humidity based upon the selected duty cycle.

9 Claims, 2 Drawing Sheets

U.S. PATENT DOCUMENTS

| | | | |
|---|---|---|---|
| 4,367,133 A | 1/1983 | Lauer | |
| 4,393,013 A | 7/1983 | McMenamin | |
| 4,464,927 A | 8/1984 | Reid | |
| 4,557,138 A | 12/1985 | Dumitriu-Valcea et al. | |
| 4,632,789 A | 12/1986 | Reid | |
| 4,656,865 A | 4/1987 | Callan | |
| 4,852,389 A | 8/1989 | Mayer et al. | |
| 4,973,395 A | 11/1990 | Mayer et al. | |
| 5,053,116 A | 10/1991 | Mayer | |
| 5,107,696 A | 4/1992 | Mayer et al. | |
| 5,139,638 A | 8/1992 | Mayer | |
| 5,159,829 A | 11/1992 | Mayer et al. | |
| 5,173,258 A | 12/1992 | Childers | |
| 5,314,605 A | 5/1994 | Matthiessen | |
| 5,824,918 A | 10/1998 | Zuk | |
| 5,954,685 A | 9/1999 | Tierney | |
| 5,957,380 A | 9/1999 | Fitterman et al. | |
| 5,958,200 A | 9/1999 | Kassel | |
| 5,988,003 A | 11/1999 | Zuk | |
| 6,616,330 B2 | 9/2003 | Nakamura et al. | |
| 2007/0023536 A1 | 2/2007 | Baston | |

FOREIGN PATENT DOCUMENTS

| | | | |
|---|---|---|---|
| EP | 0974834 A2 | | 6/1999 |
| JP | 5-50697 B2 | | 3/1993 |
| JP | 2003/065943 | | 3/2003 |
| JP | 5050697 A | * | 3/2003 |
| JP | 2003065943 A | * | 3/2003 |

* cited by examiner

SYSTEM AND METHOD FOR GENERATING A GAS SAMPLE OF KNOWN AND ADJUSTABLE RELATIVE HUMIDITY

This application is a divisional of U.S. application Ser. No. 11/611,511 filed Dec. 15, 2006, now U.S. Pat. No. 7,578,208.

BACKGROUND

The conventional method for measuring the barrier properties of films consists of placing a film sample between two chambers containing a test gas of interest in a first chamber and a carrier gas in the second chamber. As the test gas permeates through the film sample it is collected in the second chamber and subsequently measured by an appropriate detector.

Factors which contribute to the measurement value are often referenced and include film thickness, temperature, relative humidity, and other specifics of the test gas mixture, such as ratios of other gases present.

Testing should typically be conducted at various temperatures and relative humidity to ascertain the effect each of these factors has upon permeability of the film.

Accordingly, a need exists for a cost effective system and method capable of generating test gases of known relative humidity with the ability to quickly, simply and accurately adjust the relative humidity of the test gas between 0% and 100%.

SUMMARY OF THE INVENTION

A first aspect of the invention is a system for providing a destination point with a gas having a selectable known humidity. A first embodiment of the first aspect of the invention is a system including: (i) a source of a gas having an initial relative humidity, (ii) a supply line in fluid communication with the gas source for directing gas from the gas source to a destination point, wherein the supply line includes (A) a wet path effective for humidifying gas from the gas source passing along the wet path to a first known relative humidity greater than the initial relative humidity, (B) a dry path effective for maintaining the initial relative humidity of gas from the gas source passing along the dry path, and (C) a junction point downstream from the wet and dry paths and upstream from the destination point, where gas passing along the wet and dry paths are merged prior to delivery to the destination point, and (iii) at least one valve in fluid communication with the supply line for mutually exclusively effecting gas flow from the gas source along the wet path or the dry path. The system is capable of: (a) providing the destination point with a gas at the first known relative humidity by directing gas flow along only the wet path, (b) providing the destination point with a gas at the initial relative humidity by directing gas flow along only the dry path, and (c) providing the destination point with a gas having a known relative humidity anywhere between the initial relative humidity and the first relative humidity by alternating gas flow along the wet path and the dry path on a predetermined duty cycle.

A second embodiment of the first aspect of the invention is a system including: (i) a source of a gas having an initial relative humidity, (ii) a supply line in fluid communication with the gas source for directing gas from the gas source to a destination point, wherein the supply line includes (A) a wet path effective for humidifying gas from the gas source passing along the wet path to a first known relative humidity greater than the initial relative humidity, (B) a dry path effective for decreasing the relative humidity of gas from the gas source passing along the dry path to a second known relative humidity less than the initial relative humidity, and (C) a junction point downstream from the wet and dry paths and upstream from the destination point, where gas passing along the wet and dry paths are merged prior to delivery to the destination point, and (iii) at least one valve in fluid communication with the supply line for mutually exclusively effecting gas flow from the gas source along the wet path or the dry path. The system is capable of: (a) providing the destination point with a gas at the first known relative humidity by directing gas flow along only the wet path, (b) providing the destination point with a gas at the second relative humidity by directing gas flow along only the dry path, and (c) providing the destination point with a gas having a known relative humidity anywhere between the first relative humidity and the second relative humidity by alternating gas flow along the wet path and the dry path on a predetermined duty cycle.

A second aspect of the invention is a method of producing a gas having a selectable relative humidity. A first embodiment of the second aspect of the invention is a method including the steps of: (i) alternating flow of a gas having an initial relative humidity on a predetermined cycle time and duty cycle as between (A) a wet path effective for humidifying the gas to a first known relative humidity greater than the initial relative humidity to produce a wet gas, and (B) a dry path effective for maintaining the initial relative humidity of the gas to provide a dry gas, and (ii) blending the alternatingly generated slugs of wet gas and dry gas so as to produce a blended gas having a selected relative humidity.

A second embodiment of the second aspect of the invention is a method including the steps of: (i) alternating flow of a gas having an initial relative humidity on a predetermined cycle time and duty cycle as between (A) a wet path effective for humidifying the gas to a first known relative humidity greater than the initial relative humidity to produce a wet gas, and (B) a dry path effective for decreasing the relative humidity of the gas to a second known relative humidity less than the initial relative humidity to produce a dry gas, and (ii) blending the alternatingly generated slugs of wet gas and dry gas so as to produce a blended gas having a selected relative humidity.

DETAILED DESCRIPTION OF AN EMBODIMENT OF THE INVENTION INCLUDING A BEST MODE

| | Nomenclature |
|---|---|
| 10 | System |
| 20 | Source of Pressurized Gas |
| $30_{wet}$ | Humidification Chamber |
| $30_{dry}$ | Drying Chamber |
| 40 | Valve |
| $40_{wet}$ | Valve in Wet Path |
| $40_{dry}$ | Valve in Dry Path |
| 50 | Mixing Chamber |
| 60 | Flow Control Valve |
| 70 | Humidity Sensor |
| 80 | Supply Line |
| 80a | Length of Supply Line Running from the Gas Source to the |

-continued

| | Nomenclature |
|---|---|
| | Point of Divergence into the Wet Path and the Dry Path |
| 80b | Length of Supply Line Running from the Point of Convergence of the Wet Path and the Dry Path to the Destination Point |
| $80_{wet}$ | Length of Supply Line Forming the Wet Path |
| $80_{dry}$ | Length of Supply Line Forming the Dry Path |
| 81 | Point of Divergence of Supply Line into Wet and Dry Paths |
| 82 | Point of Convergence of Wet and Dry Paths |
| 90 | Testing Instrument |
| 99 | Testing Chamber of Testing Instrument |
| 100 | Microprocessor |

Definitions

As utilized herein, including the claims, the phrase "duty cycle" means the ratio of the time gas flow is directed through the wet chamber to cycle time, typically represented as a %.

As utilized herein, including the claims, the phrase "cycle time" means the time required to complete one sequence of providing a gas flow through the wet path and providing a gas flow through the dry path.

As utilized herein, including the claims, the phrase "a relative humidity of approximately 0%" means a relative humidity of 0% or slightly more due to the subtle variations, nuances and vagaries of dehumidification systems. Typically, a relative humidity of approximately 0% should have a relative humidity of less than 1%.

As utilized herein, including the claims, the phrase "a relative humidity of approximately 100%" means a relative humidity of 100% or slightly less due to the subtle variations, nuances and vagaries of humidification systems. Typically, a relative humidity of approximately 100% should have a relative humidity of at least 99%.

As utilized herein, including the claims, the term "dry gas" means a gas having a relative humidity of approximately 0%.

Structure

Figure 1:
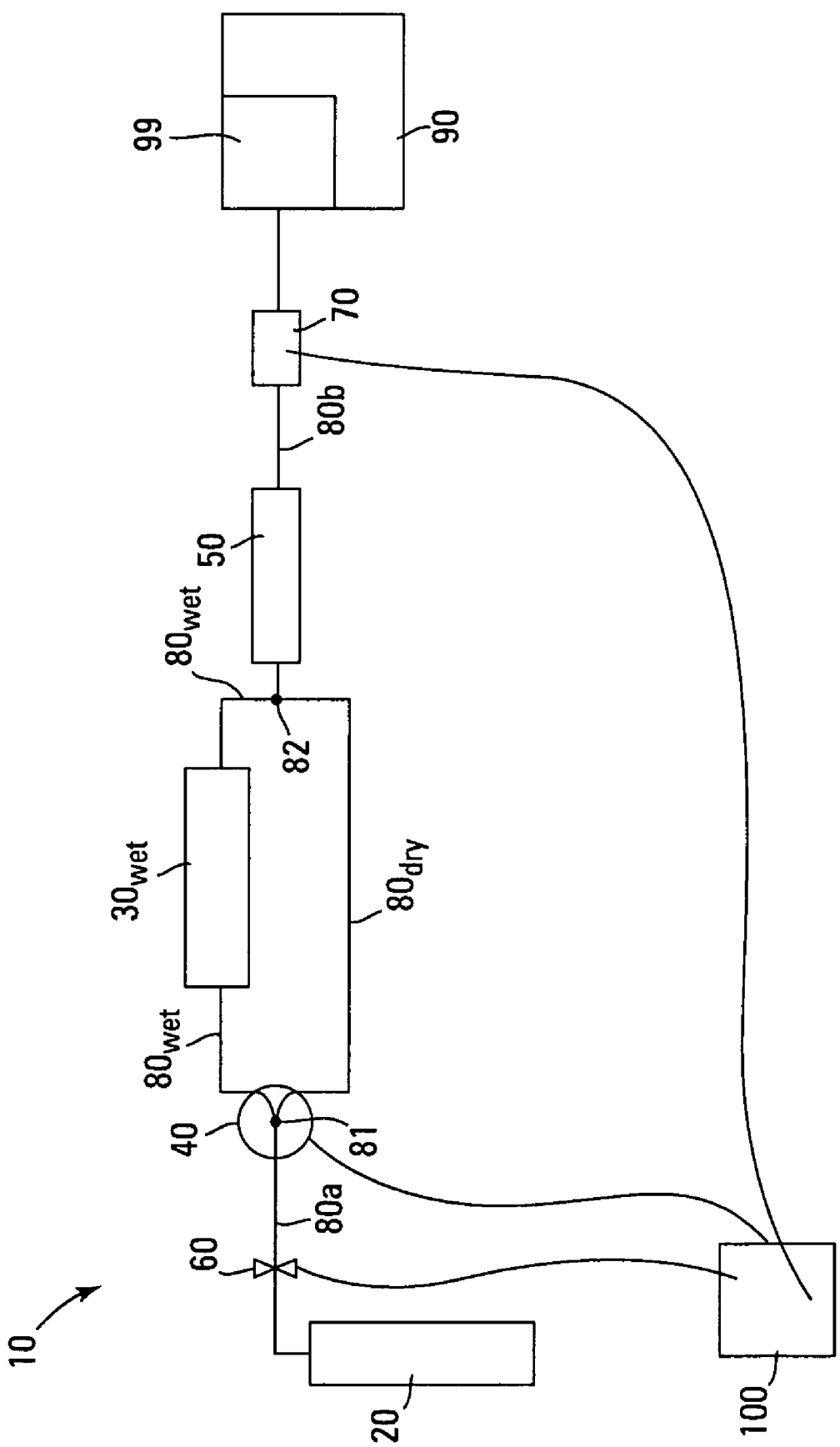
FIG. 1 is a schematic view of one embodiment of the invention.
Figure 2:
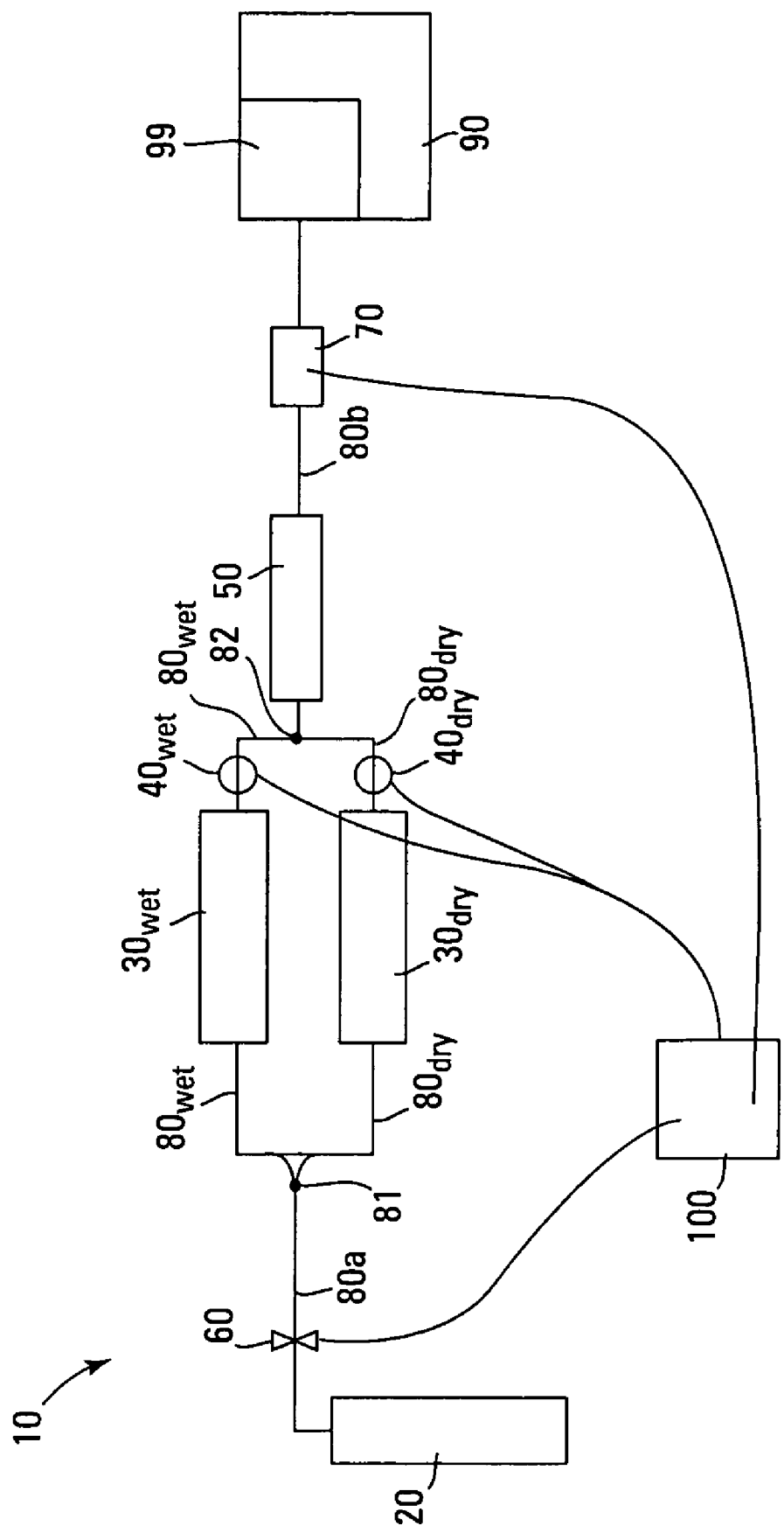
FIG. 2 is a schematic view of a second embodiment of the invention.

As shown in FIGS. 1 and 2, a first aspect of the invention is a system 10 for quantitatively humidifying gas provided to a destination point, such as the testing chamber 99 of a testing instrument 90. Referring to FIG. 1, a first embodiment of the system 10 includes (i) a source of a gas 20 having an initial relative humidity in fluid communication with the testing chamber 99 of a testing instrument 90, (ii) a wet chamber $30_{wet}$ intermediate the testing chamber 99 and the gas source 20 effective for humidifying gas flowing through the wet chamber $30_{wet}$ to produce a wet gas having a first known relative humidity greater than the initial relative humidity, (iii) a length of supply line $80_{dry}$ in fluid communication with the testing chamber 99 and the gas source 20 bypassing the wet chamber $30_{wet}$ so as to be effective for providing gas from the gas source 20 to the testing chamber 99 without passing the gas through the wet chamber $30_{wet}$, and (iv) at least one valve 40 for mutually exclusively effecting gas flow from the gas source 20 to the testing chamber 99 through either the wet chamber $30_{wet}$ (i.e., a wet path) or the bypass supply line $80_{dry}$ (i.e., a dry path).

Referring to FIG. 2, a second embodiment of the system 10 including (i) a source of a gas 20 having an initial relative humidity in fluid communication with the testing chamber 99, (ii) a wet chamber $30_{wet}$ intermediate the testing chamber 99 and the gas source 20 effective for humidifying gas flowing through the wet chamber $30_{wet}$ to produce a wet gas having a first known relative humidity greater than the initial relative humidity, (iii) a dry chamber $30_{dry}$ intermediate the testing chamber 99 and the gas source 20 effective for drying gas flowing through the dry chamber $30_{dry}$ to produce a dry gas having a second relative humidity less than the initial relative humidity, and (iv) at least one valve 40 for mutually exclusively effecting gas flow from the gas source 20 to the testing chamber 99 through either the wet chamber $30_{wet}$ (i.e., a wet path) or the dry chamber $30_{dry}$ (i.e., a dry path).

Gas having an initial relative humidity of approximately 0% is preferred as the initial relative humidity does not tend to fluctuate much over time as a result of variances from lot to lot as supplied, or variance in local temperature and/or pressure. The desired first relative humidity target (i.e., the relative humidity of wet gas) is approximately 100% as this is the most straight-forward and simplest target to achieve on a consistent basis. Similarly, the desired second relative humidity target (i.e., the relative humidity of dry gas) is approximately 0% as this is the most straight-forward and simplest target to achieve on a consistent basis.

Referring to FIG. 1, the first embodiment of the system 10 can be effectively employed to provide a destination point with a gas having a known relative humidity anywhere between the initial relative humidity of the gas (preferably approximately 0%) and the first relative humidity (preferably approximately 100%) by controlling the amount of gas flowing through the wet chamber $30_{wet}$ and the bypass supply line $80_{dry}$ (i.e., controlling the duty cycle). The relative humidity of the resultant blended gas can be calculated using Formula A set forth below:

$$RH_{Blended}=(RH_{wet})(DutyCycle/100)+(RH_{initial})((100-DutyCycle)/100) \quad \text{FORMULA A}$$

Referring to FIG. 2, the second embodiment of the system 10 can be effectively employed to provide a destination point with a gas having a known relative humidity anywhere between the second relative humidity (preferably approximately 0%) and the first relative humidity (preferably approximately 100%) by controlling the amount of gas flowing through the wet chamber $30_{wet}$ and the dry chamber $30_{dry}$ (i.e., controlling the duty cycle). The relative humidity of the resultant blended gas can be calculated using Formula B set forth below:

$$RH_{Blended}=(RH_{wet})(DutyCycle/100)+(RH_{dry})((100-DutyCycle)/100) \quad \text{FORMULA B}$$

The gas source 20 is preferably a pressure tank (not shown) containing a relatively dry gas, and when employed to deliver gas to a testing instrument 90 should have no measurable quantities of the analyte to be measured by the testing instrument 90. Common analytes measured by testing instruments 90 include oxygen ($O_2$), carbon monoxide (CO) and volatile organic compounds (VOCs). Gases typically employed as the "carrier" and/or "flushing" gas for such testing instruments 90 are the inert atmospheric gases of nitrogen ($N_2$) and carbon dioxide ($CO_2$).

The wet chamber $30_{wet}$ contains a source of water positioned within the wet chamber $30_{wet}$ for saturating the gas as it flows through the wet chamber $30_{wet}$. The construction and design of such humidification chambers is well within the ability of those possessing ordinary skill in the art.

Similarly, the dry chamber $30_{dry}$ contains a desiccant positioned within the dry chamber $30_{dry}$ for drying the gas as it flows through the dry chamber $30_{dry}$. The construction and design of such a dehumidification chamber is well within the ability of those possessing ordinary skill in the art.

At least one valve 40 is positioned between the gas source 20 and the testing chamber 99 for providing mutually exclusive alternating gas flow from the gas source 20 to the testing chamber 99 through the wet path (i.e., through the wet chamber $30_{wet}$) and the dry path (i.e., through the bypass supply line $80_{dry}$ with or without a dry chamber $30_{dry}$). The necessary and desired functionality of providing mutually exclusive alternating gas flow through the wet path and the dry path can be achieved by employing a single three-way valve 40, as shown in FIG. 1, or a pair of commonly controlled valves $40_{wet}$ and $40_{dry}$, as shown in FIG. 2. The valve(s) 40 may be positioned upstream or downstream from the wet chamber $30_{wet}$ and the dry chamber $30_{dry}$, as shown in FIGS. 1 and 2 respectively.

A mixing chamber 50 is preferably provided between the wet and dry chambers $30_{wet}$, $30_{dry}$ and the destination point (e.g., testing equipment 90) for receiving gas flow from both the wet path and the dry path and effecting a blending of the "slugs" of wet and dry gas emanating from the two paths to ensure that the gas reaching the destination point is a blended gas having a consistent and uniform relative humidity.

A flow control valve 60 can be provided between the gas source 20 and the point at which the supply line 80 separates into the wet and dry paths (i.e., a $80_{wet}$ and $80_{dry}$) for controlling gas flow through the system 10. The flow control valve 60 can be controlled by a microprocessor 100.

A humidity sensor 70 can be placed in sensing communication with the blended gas for providing feedback as to the relative humidity of the blended gas and permitting "fine tuning" of the duty cycle to achieve the targeted relative humidity. The humidity sensor 70 can be placed in electrical communication with a microprocessor 100 for transmitting sensed relative humidity data to the microprocessor 100 for use in adjusting the flow rate or cycle time, for purposes of reducing cyclical variances in the relative humidity of the blended gas caused by incomplete blending of the wet and dry "slugs" of gas, or adjusting the duty cycle, for purposes of reducing or eliminating any variance between the calculated relative humidity and the actual or sensed relative humidity of the blended gas.

A supply line fluidly interconnects the various components of the system 10, and includes a first section 80a running from the gas source 20 to a point of divergence 81 where the supply line 80 splits into a wet path $80_{wet}$ and a dry path $80_{dry}$, and a second section 80b running from the point at which the wet path $80_{wet}$ and dry path $80_{dry}$ converge 82 to the destination point.

The microcontroller 100 preferably includes customary user interface components (not shown) such as a monitor, keyboard, mouse, etc. for permitting a user to track calculated and sensed relative humidity and adjust flow rate, cycle time and duty cycle as necessary and appropriate to achieve or change the desired relative humidity.

Cycle time can be limited by the response time of the valve 40, but should be selected so as to ensure that the size of the wet and dry "slugs" are capable of being uniformly blended prior to delivery to the destination point. Generally, a cycle time of between about 0.1 to about 10 seconds is effective for achieving the desired goal of providing a homogeneous blend of the wet and dry gases with a response time of less than 0.1 seconds placing significant wear and tear on the valve 40 without a corresponding benefit, and a response time of greater than about 10 seconds periodically resulting in an incomplete blending of the wet and dry gases prior to deliver to the destination point.

EXAMPLES

Example 1

A gas having a relative humidity set forth in Table One ($RH_{Initial}$) is directed through the humidity conditioning system 10 shown in FIG. 1. The wet chamber $30_{wet}$ of the system 10 is configured and arranged to increase to the relative humidity of the gas to the first relative humidity set forth in Table One ($RH_{wet}$). The duty cycle necessary to achieve the desired final relative humidity ($RH_{Final}$) set forth in Table One can be calculated using Formula C set forth below. The calculated duty cycle is also set forth in Table One.

$$\text{Duty Cycle} = 100(1-(RH_{wet}-RH_{Final})/(RH_{Wet}-RH_{Initial})) \quad \text{FORMULA C}$$

TABLE ONE

| $RH_{Initial}$ % | $RH_{Wet}$ % | $RH_{Final}$ % | Duty Cycle % |
|---|---|---|---|
| 0 | 100 | 100 | 100 |
| 0 | 100 | 0 | 0 |
| 0 | 100 | 50 | 50 |
| 10 | 100 | 50 | 44.5 |
| 40 | 100 | 50 | 16.7 |
| 0 | 90 | 50 | 55.6 |
| 0 | 50 | 50 | 100 |
| 0 | 100 | 30 | 30 |
| 0 | 100 | 80 | 80 |
| 10 | 90 | 50 | 50 |
| 10 | 90 | 70 | 75 |
| 0 | 90 | 20 | 22.2 |

Example 2

A gas is directed through the humidity conditioning system 10 shown in FIG. 2. The wet chamber $30_{wet}$ of the system 10 is configured and arranged to increase to the relative humidity of the gas to the first relative humidity set forth in Table Two ($RH_{Wet}$), and the dry chamber $30_{dry}$ of the system 10 is configured and arranged to decrease the relative humidity of the gas to the second relative humidity set forth in Table Two ($RH_{Dry}$). The duty cycle necessary to achieve the desired final relative humidity ($RH_{Final}$) set forth in Table Two can be calculated using Formula D set forth below. The calculated duty cycle is also set forth in Table Two.

$$\text{Duty Cycle} = 100(1-(RH_{wet}-RH_{Final})/(RH_{Wet}-RH_{Dry}))$$

TABLE TWO

| $RH_{Dry}$ % | $RH_{Wet}$ % | $RH_{Final}$ % | Duty Cycle % |
|---|---|---|---|
| 0 | 100 | 100 | 100 |
| 0 | 100 | 0 | 0 |
| 0 | 100 | 50 | 50 |
| 10 | 100 | 50 | 44.5 |
| 0 | 90 | 50 | 55.6 |
| 0 | 50 | 50 | 100 |
| 0 | 100 | 30 | 30 |
| 0 | 100 | 80 | 80 |
| 10 | 90 | 50 | 50 |
| 10 | 90 | 70 | 75 |
| 0 | 90 | 20 | 22.2 |

I claim:

1. A system for providing a gas stream having an adjustable known humidity, comprising:
 (a) a source of a gas having an initial relative humidity,
 (b) a supply line in fluid communication with the gas source for directing gas from the gas source to a destination point, the supply line including:
  (i) a wet path effective for humidifying gas from the gas source passing along the wet path to a first known relative humidity greater than the initial relative humidity, (ii) a dry path effective for maintaining the initial relative humidity of gas from the gas source passing along the dry path, and (iii) a junction point downstream from the wet and dry paths and upstream from the destination point, where gas passing along the wet and dry paths are merged prior to delivery to the destination point, and (c) at least one valve in fluid communication with the supply line for mutually exclusively effecting gas flow from the gas source along the wet path or the dry path, (d) whereby (i) effecting gas flow along the wet path only provides the destination point with a gas having the first known relative humidity, (ii) effecting gas flow along the dry path only provides the destination point with a gas having the initial relative humidity, and (iii) alternating gas flow along the wet and dry paths on a predetermined duty cycle provides the destination point with a gas having a known relative humidity between the initial relative humidity and the first relative humidity.

2. The system of claim 1 further comprising a flow control valve intermediate the gas source and the valve for selectively controlling gas flow through the system.

3. The system of claim 1 further comprising a microcontroller in electrical communication with the at least one valve for controlling the duty cycle to produce a blended gas having a predetermined relative humidity between the initial relative humidity and the first relative humidity.

4. The system of claim 1 wherein the initial relative humidity is approximately 0%.

5. The system of claim 1 wherein the first known relative humidity is approximately 100%.

6. The system of claim 1 wherein the destination point is a testing chamber of a testing instrument.

7. The system of claim 6 wherein the testing instrument is a permeation testing instrument.

8. The system of claim 7 wherein the permeation testing instrument is an oxygen permeation instrument.

9. The system of claim 7 wherein the permeation testing instrument is a carbon dioxide permeation instrument.

* * * * *